(12) United States Patent
Uchimura et al.

(10) Patent No.: US 7,898,142 B2
(45) Date of Patent: Mar. 1, 2011

(54) ELECTRIC MOTOR WITH BRUSH

(75) Inventors: Hiroyuki Uchimura, Kiryu (JP); Hiroyuki Shibusawa, Kiryu (JP)

(73) Assignee: MITSUBA Corporation, Kiryu-shi (JP)

( * ) Notice: Subject to any disclaimer, the term of this patent is extended or adjusted under 35 U.S.C. 154(b) by 254 days.

(21) Appl. No.: 12/146,699

(22) Filed: Jun. 26, 2008

(65) Prior Publication Data
US 2009/0001829 A1 Jan. 1, 2009

(30) Foreign Application Priority Data
Jun. 28, 2007 (JP) .............................. 2007-169924

(51) Int. Cl.
*H01R 39/36* (2006.01)
*H02K 13/00* (2006.01)

(52) U.S. Cl. .................... 310/249; 310/83; 310/239; 310/242

(58) Field of Classification Search ............ 310/83, 310/239, 249, 242
See application file for complete search history.

(56) References Cited

U.S. PATENT DOCUMENTS

| | | | | |
|---|---|---|---|---|
| 4,572,979 | A * | 2/1986 | Haar et al. | 310/68 R |
| 5,013,952 | A * | 5/1991 | Sekine et al. | 310/239 |
| 6,191,512 | B1 * | 2/2001 | Lekeux et al. | 310/89 |
| 6,317,332 | B1 * | 11/2001 | Weber et al. | 361/760 |
| 6,573,625 | B2 * | 6/2003 | Shimizu et al. | 310/71 |
| 6,577,029 | B1 * | 6/2003 | Weber et al. | 310/68 R |
| 6,756,711 | B2 * | 6/2004 | Matsuyama et al. | 310/68 R |
| 6,873,076 | B2 * | 3/2005 | Kaeufl et al. | 310/91 |
| 7,192,317 | B2 * | 3/2007 | Nakagawa et al. | 439/736 |
| 2003/0030347 | A1 * | 2/2003 | Lee | 310/239 |
| 2004/0245886 | A1 * | 12/2004 | Uchida | 310/239 |
| 2005/0040715 | A1 * | 2/2005 | Nesic | 310/71 |
| 2006/0055257 | A1 * | 3/2006 | Mizutani et al. | 310/71 |
| 2006/0158057 | A1 * | 7/2006 | Huck et al. | 310/239 |
| 2006/0232152 | A1 * | 10/2006 | Becker et al. | 310/71 |
| 2007/0018517 | A1 * | 1/2007 | Huck et al. | 310/71 |

FOREIGN PATENT DOCUMENTS

| | | |
|---|---|---|
| CN | 2038297 U | 5/1989 |
| JP | 2000014073 A * | 1/2000 |
| JP | 2001-346355 | 12/2001 |

OTHER PUBLICATIONS

Chinese Office Action and English translation for Application No. 200810127516.7 dated May 13, 2010.

* cited by examiner

*Primary Examiner*—Quyen Leung
*Assistant Examiner*—Alex W Mok
(74) *Attorney, Agent, or Firm*—McCormick, Paulding & Huber LLP

(57) ABSTRACT

General versatility of a brush holder is enhanced regarding a difference of specifications of connector parts, and costs of an electric motor with brush are reduced. A pair of brush-side connection terminals electrically connected to brushes is provided to a brush holder mounted inside a motor yoke. A connector part and a pinching part are provided in a connector unit formed separately from the brush holder, power connection terminals are provided in the connector part, and connector-side connection terminals electrically connected to the power connection terminals are provided inside the pinching part. The pinching part is disposed so as to overlap with the brush holder axially, thereby electrically connecting the brush-side connection terminals and the connector-side connection terminals, and the brushes are electrically connected respectively to the power connection terminals, and the pinching part is sandwiched and fixed between the motor yoke and a gear case.

20 Claims, 12 Drawing Sheets

ELECTRIC MOTOR WITH BRUSH

CROSS-REFERENCE TO RELATED APPLICATIONS

Applicant hereby claims foreign priority benefits under U.S.C. §119 from Japanese Patent Application No. 2007-169924 filed on Jun. 28, 2007, the contents of which are incorporated by reference herein.

TECHNICAL FIELD OF THE INVENTION

The present invention relates to an electric motor with brush, which supplies a current to armature coils via brushes and a commutator.

BACKGROUND OF THE INVENTION

Conventionally, an electric motor with reduction gear in which a motor body and a reduction gear are unitized has been used as a drive source for a power window apparatus, and a sunroof device, etc., and an electric motor with brush in which a current is supplied to armature coils via brushes and a commutator has been widely used as a motor body.

The electric motor with brush is provided with a motor case (yoke) in which a pair of magnets is fixed to an inner circumferential surface thereof, and an armature having an armature shaft is rotatably accommodated inside the motor case. The armature is provided with a plurality of armature coils. In order to supply the current to these armature coils, a commutator (rectifier) is fixed to the armature shaft, and a pair of brushes is held at a brush holder mounted in the motor case. Each of the brushes is in slide contact with an outer circumference of the commutator, and when each of the brushes is connected to a power source, the current is supplied to each of the armature coils via the brushes and the commutator at a predetermined timing to rotate the armature.

This above electric motor is provided with a power-supply connector part in order to connect each brush to the power source, and since the connector part is connected to an external connector located on a power-source side, the current is intended to be supplied to the brushes.

For example, Patent Document 1 (Japanese Patent Application Laid-Open Publication No. 2001-346355) discloses an electric motor in which a power-supply connector part is integrally formed with a brush holder made of a resin; the brush holder is sandwiched and fixed between an opening end of a motor case and a gear case of a reduction gear; and the connector part is caused to project outside the motor case from between the motor case and the gear case.

SUMMARY OF THE INVENTION

In order to make electric motors, such as power window motors, applied to a plurality of types of vehicles, a plurality of specified motors different in specifications of connector parts need to be prepared depending on shapes and inserting directions of external connectors provided to a vehicle-body side.

However, in the electric motor disclosed in Patent Document 1, since the connector part is integrally formed with the brush holder using a resin material, a plurality of types of brush holders different in specifications of the connector parts need to be prepared according to the specifications of the external connectors. For this reason, a plurality of dies corresponding to the respective brush holders must be prepared, which results in an increase in costs of the electric motor with brush.

In addition, in order to form the connector part and the brush holder in one unit, the shape of the dies for resin-molding the brush holder becomes complicated because many slide type dies are required in addition to upper and lower type dies, and further the size of the die itself is made large, which results in an increase in costs of the die.

An object of the present invention is to enhance general versatility of a brush holder with respect to different specifications of connector parts, and to reduce costs of an electric motor with brush.

An electric motor with brush according to the present invention has a commutator and a plurality of brushes brought in slide contact with the commutator, the electric motor with brush comprising: a motor case formed into a bottomed cylindrical shape whose one end has an opening and in an inner face of which a magnetic field portion is provided; a brush holder mounted inside the motor case and holding the plurality of brushes; an armature shaft rotatably supported by the motor case and fixing the commutator; a plurality of armature coils each connected to the commutator and rotating along with the armature shaft; an end case attached to an opening end of the motor case and blocking the opening of the motor case; a connector unit including a pinching part disposed so as to overlap with the brush holder axially and sandwiched and fixed between the motor case and the end case, and a power-supply connector part integrally formed with the pinching part and disposed outside the motor case; a plurality of brush-side connection terminals provided in the brush holder and electrically connected respectively to the corresponding brushes; and a plurality of connector-side connection terminals provided in the connector unit, electrically connected respectively to power connection terminals provided to the connector part, and electrically connected to the corresponding brush-side connection terminals when the pinching part is disposed so as to overlap with the brush holder axially.

The electric motor with brush according to the present invention is such that the pinching part is formed annularly, the pinching part is sandwiched and fixed by the end case and a flange part provided to the opening end of the motor case, and the plurality of connector-side connection terminals are each disposed inside the pinching part.

The electric motor with brush according to the present invention is such that an axial-directional end portion of the brush holder is positioned inside the motor case by abutting on a stepped portion provided to the inner face of the motor case, and the brush holder is sandwiched between the connector unit and the motor case.

The electric motor with brushes according to the present invention is such that a side face of the brush holder is press-fitted to the inner face of the motor case to be positioned inside the motor case.

The electric motor with brushes according to the present invention further comprises a seal member sandwiched between the motor case and the end case on a side face of the motor case or end case in the pinching part.

The electric motor with brushes according to the present invention is such that the end case is a gear case that accommodates a deceleration mechanism including a worm shaft with a worm and a worm wheel meshing with the worm, the worm shaft is connected to the armature shaft when the gear case is attached to the motor case.

The electric motor with brushes according to the present invention is such that the end case is a gear case that accommodates a deceleration mechanism including a worm integrally formed with the armature shaft and a worm wheel meshing with the worm."

According to the present invention, since the connector unit provided with the power-supply connector part is formed separately from the brush holder, a difference of specifications of the external connectors can be handled by changing only the specifications of the connector unit without changing the specifications of the brush holder. Therefore, general versatility of the brush holder is enhanced, and costs of the electric motor with brush can be reduced.

DESCRIPTION OF THE PREFERRED EMBODIMENTS

Hereinafter, an embodiment of the present invention will be described in detail based on the drawings.

Figure 1:
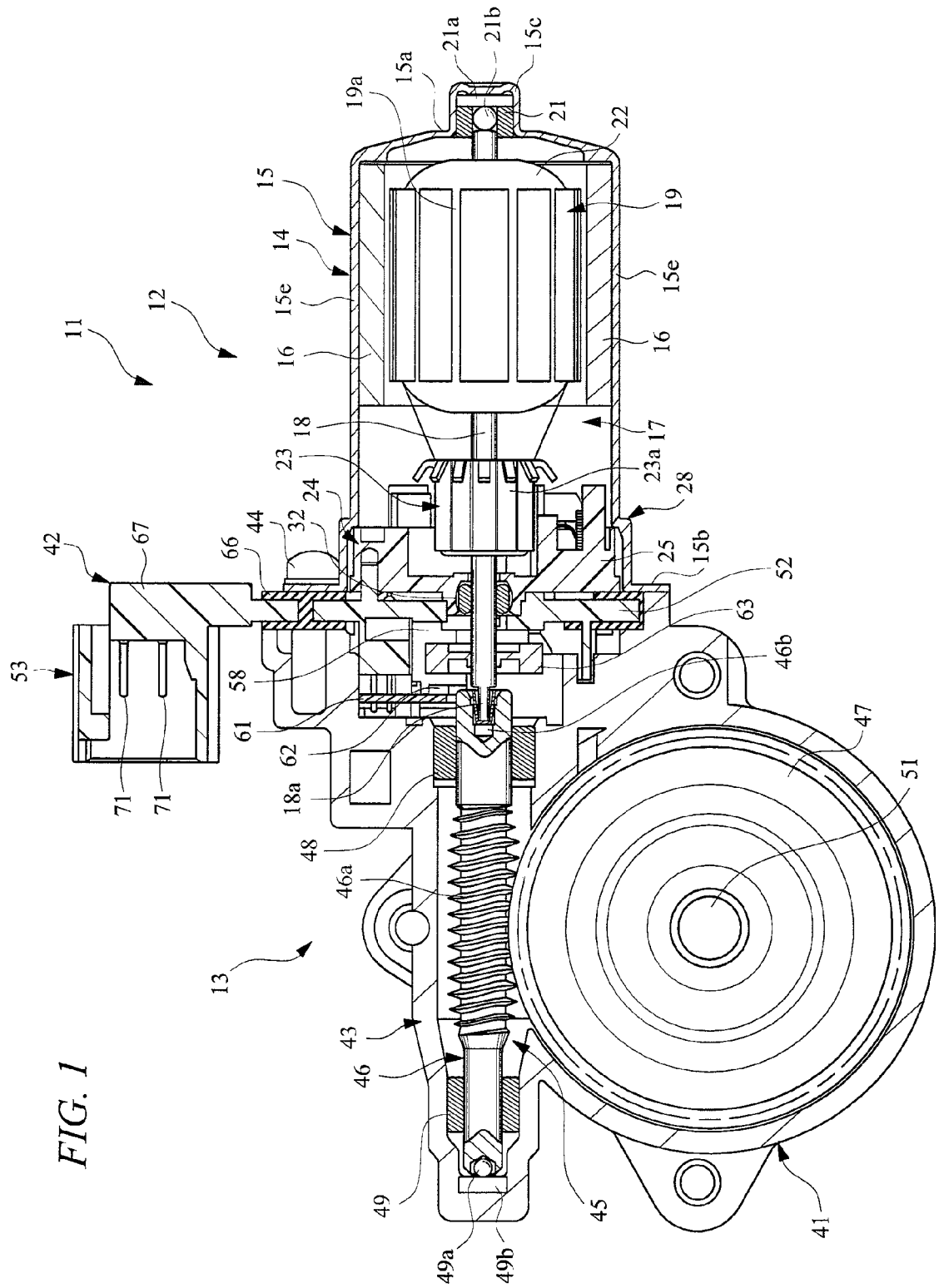
FIG. 1 is a cross-sectional view of a power window motor according to an embodiment of the present invention.

FIG. 1 is a cross-sectional view of a power window motor according to an embodiment of the present invention. A power window motor 11 as an electric motor with brush is used for a drive source of a power window apparatus provided in a vehicle (not shown), and is mounted inside a door of a vehicle body to drive a window glass via a regulator for opening/closing.

The power window motor 11 is provided with a motor body 12 and a frame unit 13, and incorporates those members as one unit, thereby serving as an electric motor with reduction gear.

Figure 2:
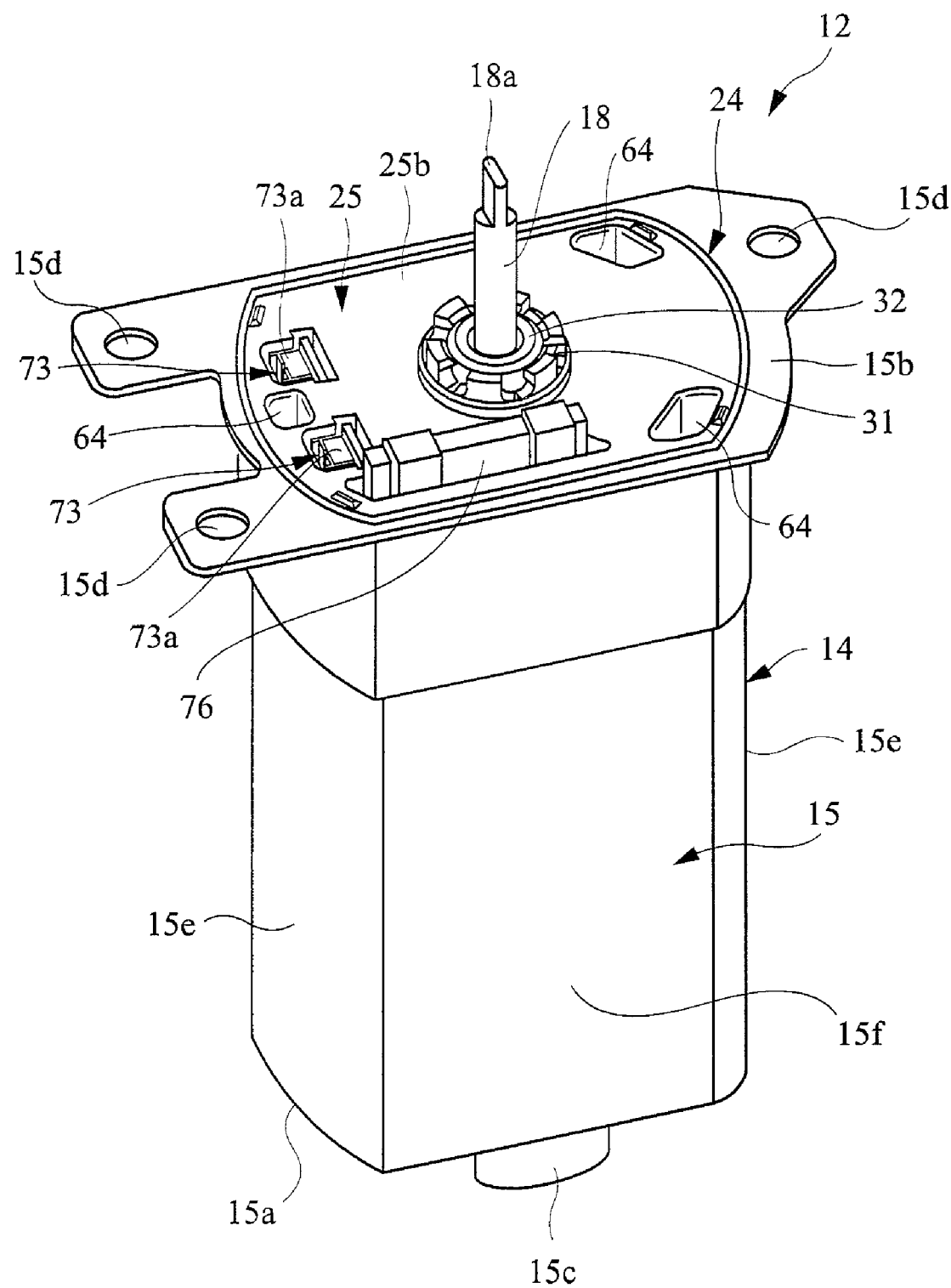
FIG. 2 is a perspective view showing a detail of a motor body shown in FIG. 1.
Figure 3:
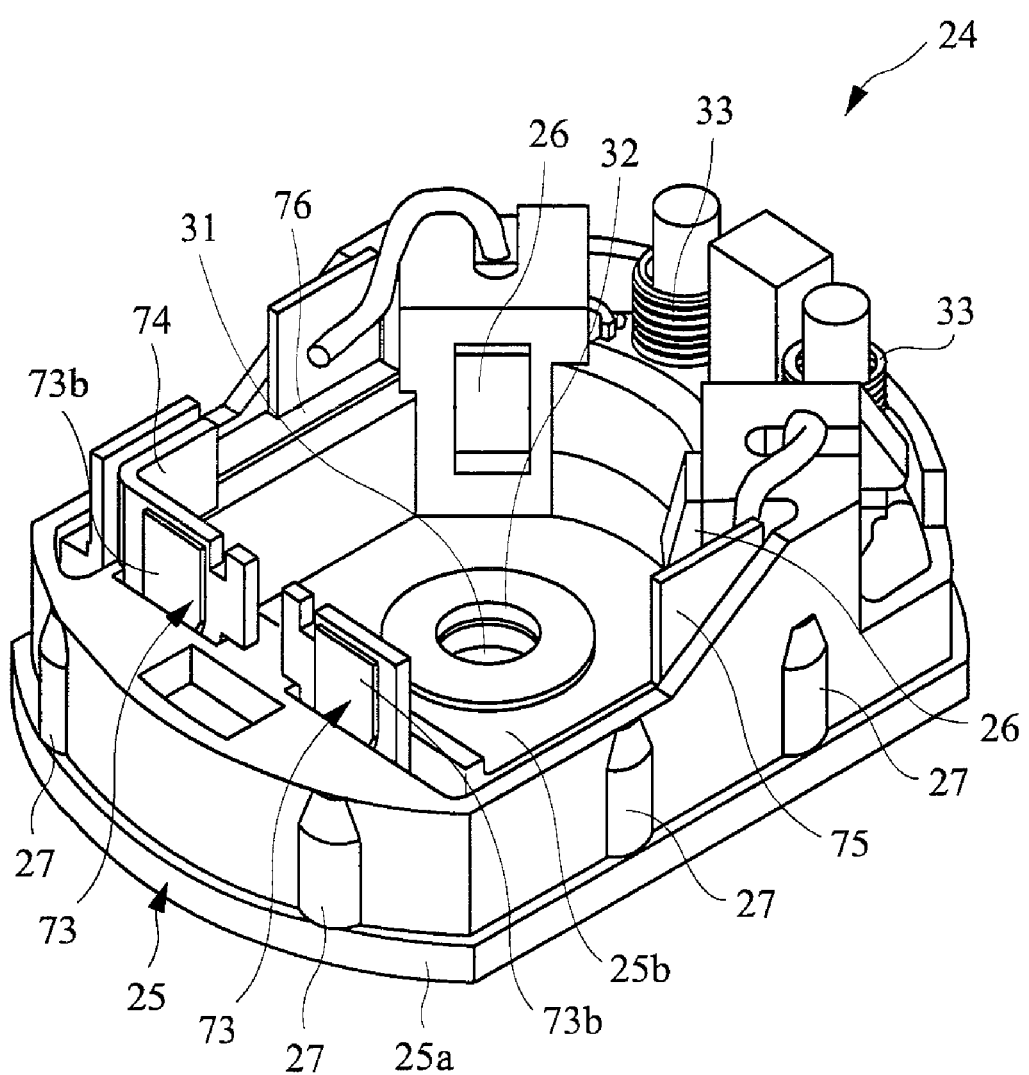
FIG. 3 is a perspective view showing a detail of a brush unit shown in FIG. 1.
Figure 4:
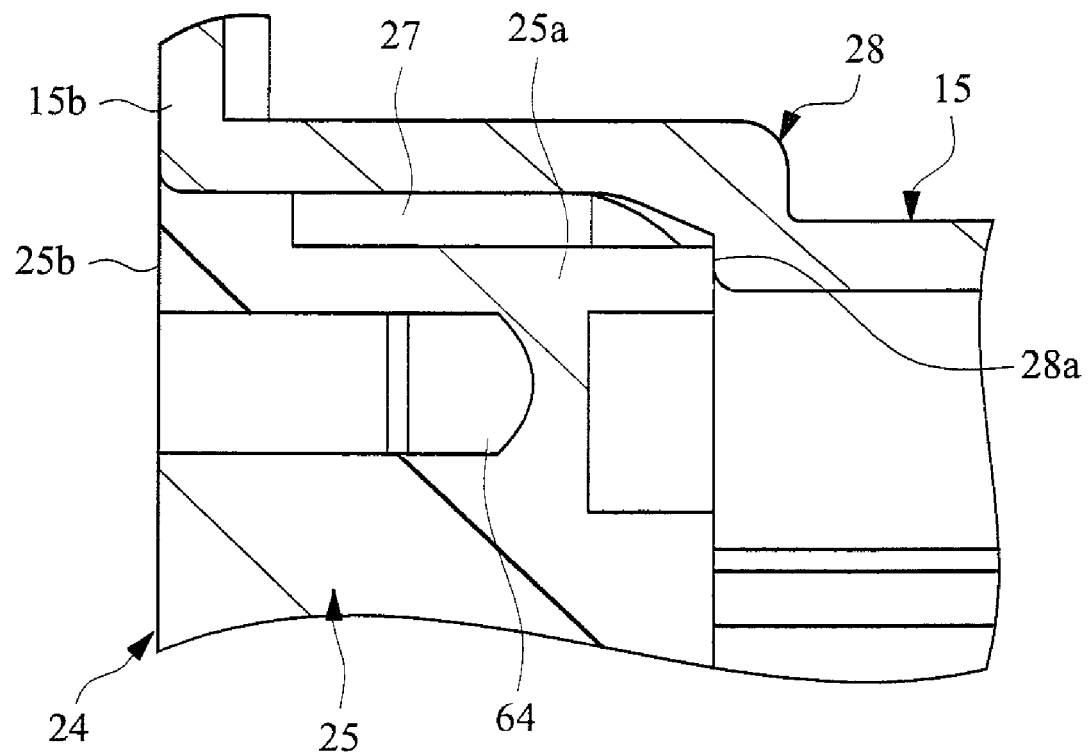
FIG. 4 is a sectional view showing a positioning structure of a brush holder into a motor yoke.

FIG. 2 is a perspective view showing a detail of a motor body shown in FIG. 1; FIG. 3 is a perspective view showing a detail of a brush unit shown in FIG. 1; and FIG. 4 is a sectional view showing a positioning structure of a brush holder into the motor yoke.

As shown in FIGS. 1 and 2, a stator 14 of the motor body 12 has a motor yoke 15 as a motor case. By performing a deep drawing to a steel plate of a conductor using a press device etc., the motor yoke 15 is formed into a bottomed cylindrical shape, a cross section of which is nearly oval and whose one end in an axial direction has an opening and whose other end is blocked by a bottom wall part 15a, wherein an end of the opening is provided with a flange part 15b projecting in a diameter direction. The oval-shaped motor yoke 15 includes an arc surface 15e and a flat surface 15f. Inside the arc surface 15e, as shown in FIG. 1, a pair of magnets 16 as a magnetic field portion is fixed so as to oppose to each other regarding the same pole. The opposite pole located on the other side of each magnet 16 reaches the flat surfaces 15f for constituting, as magnetic path, the arc surface 15e and the flat surfaces 15f of the motor yoke 15, so that a pseudo-opposite pole is formed on the flat surfaces 15f. Therefore, by the motor yokes 15 and these magnets 16, a magnetic field is intended to be created in the motor yoke 15. Note that three screw holes 15d are provided in the flange part 15b.

It should be noted that the motor yoke 15 formed into a container shape by performing a deep drawing to a steel plate is used as a motor case in Figures, but formation of the motor yoke is not limited to the deep drawing. For example, such a motor case may be a container-shaped member in which one end of a yoke body formed into a cylindrical shape by using a steel plate is blocked by a lid member made of a resin etc.

An armature 17 is accommodated inside the motor yoke 15, and the armature 17 has an armature shaft 18. One end of the armature shaft 18 is supported in a radial direction by a bearing 21 provided to a bearing support part 15c of the bottom wall part 15a of the motor yoke 15, and is supported in a thrust direction by a steel plate 21a arranged inside the bearing support part 15c and by a steel ball 21b arranged between the armature shaft 18 and the steel plate 21a. Thereby, the armature shaft 18 is rotatably supported by the motor yoke 15.

An armature core 19 is fixed to the armature shaft 18 to be positioned in the magnetic field by the magnets 16. The armature core 19 is formed into a cylindrical shape by laminating plate-shaped steels of conductor in the axial direction, and a plurality of slots 19a, each of which is opened to its outer circumference, are aligned and provided in the circumferential direction. A plurality of armature coils 22 are mounted in each of the slots 19a by lap winding, and the armature coils 22 rotate with the armature core 19, that is, the armature shaft 18.

A commutator (rectifier) 23 is fixed to the armature shaft 18 adjacently to the armature core 19 in the axial direction. The commutator 23 has a plurality of segment pieces (commutator bars) 23a aligned in the circumferential direction, and a coil end of the corresponding armature coil 22 is electrically connected to each segment piece 23a.

A brush unit 24 is mounted inside the motor yoke 15 in order to supply a driving current to each of the armature coils 22 via the commutator 23. As shown in FIG. 3, the brush unit 24 has a brush holder 25 made of a resin, and a pair of brushes 26 held at the brush holder 25.

The brush holder 25 formed by injection molding of a resin material includes, as shown in FIG. 3, an annular ring part 25a whose outer shape is formed into a nearly oval corresponding to an inner face shape of the opening of the motor yoke 15, and a plate-shaped base part 25b formed integrally with an axial-directional end portion of the ring part 25a. The brush holder 25 is mounted inside the motor yoke 15 by being inserted into the motor yoke 15 from the ring part 25a so that the base part 25b faces the outside.

A plurality of ribs 27 extending in the axial direction (direction parallel to the armature shaft 18) and projecting radially outwardly with predetermined height are provided on an outer circumference of the ring part 25a. As shown in FIG. 4, the brush holder 25 is mounted on the motor yoke 15 so that the ribs 27 are brought in slide contact with inner faces of the arc surface 15e and the flat surface 15f of the motor yoke 15. At this time, each of the ribs 27 is slightly elastically deformed radially inwardly since contacting with the inner face of the motor yoke 15. Therefore, the brush holder 25 is mounted on the inner face of the motor yoke 15 with light press-fitting, thereby preventing the brush holder 25 from being accidentally removed from the motor yoke 15. As shown in FIG. 4, the inner face of the arc surface 15e of the motor yoke 15 is provided with a stepped portion 28, which is located at a predetermined depth from the opening end by a deep drawing and has an abutment surface 28a vertical to the axial direction. The brush holder 25 is intended to be positioned axially in the motor yoke 15 so that the base part 25b is almost flush with the flange part 15b of the opening end of the motor yoke 15 by the axial-directional end portion of the ring part 25a abutting on the stepped portion 28, i.e., the abutment surface 28a.

It should be noted that in Figures, the brush holder 25 is made to abut on the abutment surface 28a of the stepped portion 28 provided to the motor yoke 15, thereby being positioned inside the motor yoke 15, but positioning of the brush holder 25 is not limited to this abutment method. For example, by an increase of a projecting amount of each rib 27 radially outwardly, the brush holder 25 is mounted in the motor yoke 15 by press-fitting, and the brush holder 25 may be positioned in the motor yoke 15 by such press-fitting.

As shown in FIGS. 2 and 3, a through hole 31 is provided at a center of an axis of the base part 25b, and a bearing (metal bearing) 32 is mounted in the through hole 31, whereby the other end side of the armature shaft 18 is rotatably supported by the bearing 32. Thus, when the brush holder 25 is mounted in the motor yoke 15, one end of the armature shaft 18 is rotatably supported by the bottom wall part 15a of the motor yoke 15 and the other end thereof is rotatably supported by the brush holder 25. Thereby, if a frame unit 13 as described later is not attached to the motor body 12, the armature 17 becomes rotatable inside the motor yoke 15, so that the motor body 12 can be alone operated by supplying a power source to a pair of brushes 26.

As shown in FIG. 3, the pair of brushes 26 is spaced 90 degrees from each other in a rotational direction of the armature shaft 18, and is held by the ring part 25a in the brush holder 25. When the brush holder 25 is mounted in the motor yoke 15, as shown in FIG. 1, the commutator 23 is located inside the ring part 25a of the brush holder 25, and each of the pair of brushes 26 is brought in slide contact with the outer circumferential surface of the commutator 23 (segment piece 23a). Each of the brushes 26 is movable forward/backward in a direction of approaching/separating to/from the commutator 23, and is biased by each of springs 33 mounted on the ring part 25a to be elastically brought in slide contact with the outer circumferential surface of the commutator 23.

Figure 5:
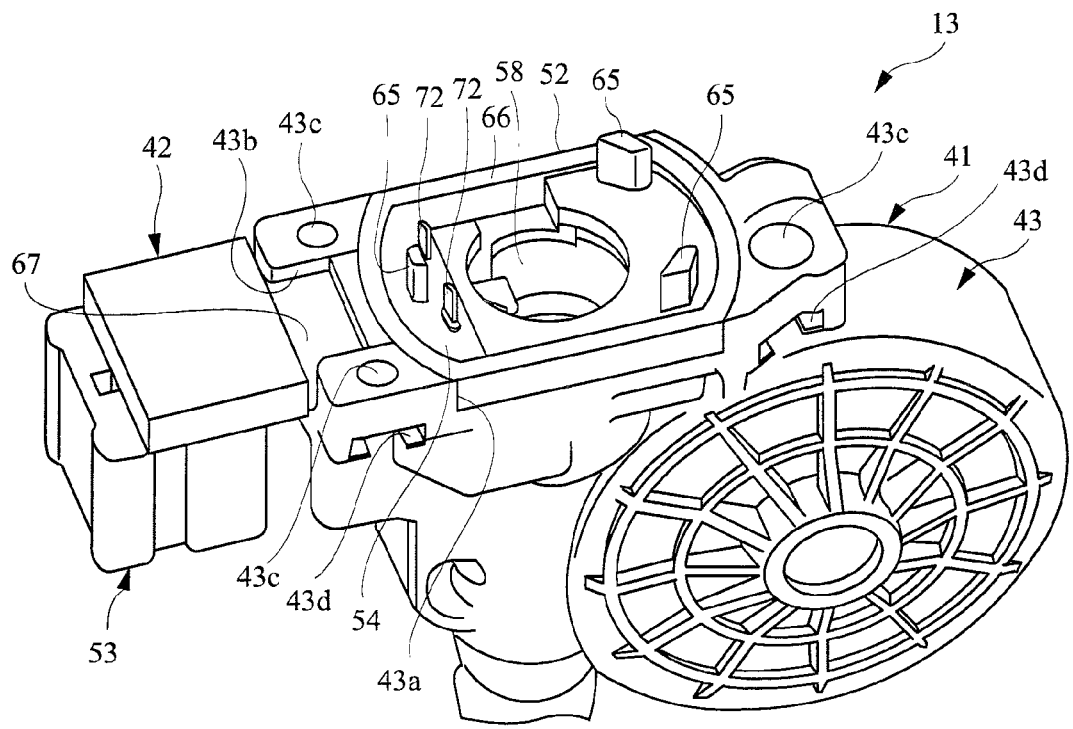
FIG. 5 is a perspective view showing a detail of a frame unit shown in FIG. 1.
Figure 6:
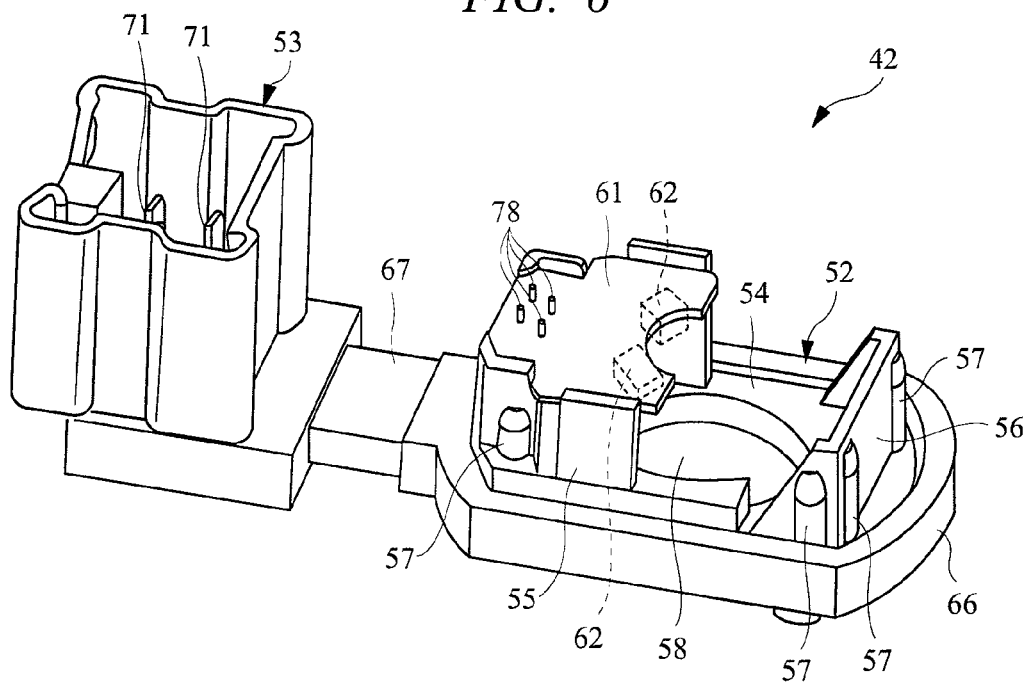
FIG. 6 is a perspective view showing a detail of a connector unit shown in FIG. 5.

FIG. 5 is a perspective view showing a detail of the frame unit 13 shown in FIG. 1; and FIG. 6 is a perspective view showing a detail of a connector unit 42 shown in FIG. 5.

As shown in FIG. 5, the frame unit 13 has a reduction gear 41 and a connector unit 42, and the frame unit 13 is constituted by the connector unit 42 being mounted on the reduction gear 41.

The reduction gear 41 has a gear case 43 as an end case. The gear case 43 is formed into a predetermined shape by injection-molding a resin material, and a guide part 43a and a guide part 43b, which serve as a guide in mounting the connector unit 42, are provided in a face for blocking the opening of the motor yoke 15. The gear case 43 is also provided with three screw holes 43c opposite to the three screw holes 15d of the motor yoke 15. Note that the reference numeral "43d" denotes a nut hole for inserting a nut member (not shown) positioned at a deep location of each screw hole 43c. Fastening members (bolts etc.) 44 are then inserted from the opening end of the motor yoke 15, that is, from each of the screw holes 15d provided in the flange part 15b, and is fastened to nuts (not shown) located in the nut holes 43d via each screw hole 43c of the gear case 43 to block the opening of the motor yoke 15.

As shown in FIG. 1, a deceleration mechanism 45 is accommodated inside the gear case 43. The deceleration mechanism 45 is a so-called worm gear mechanism, and has a worm shaft 46 and a worm wheel 47.

Both end portions of the worm shaft 46 are supported in the radial direction by bearings 48 and 49 so that the worm shaft 46 is rotatably accommodated in the gear case 43, and a worm 46a is formed integrally with the outer circumference of the worm shaft 46. In addition, a concave portion is formed in an end face of the worm shaft 46 located on a side of the bearing 49, and a steel ball 49a is provided inside the concave portion, thereby being supported in a thrust direction by a thrust plate 49b arranged on a side of the gear case 43. In order to connect the worm shaft 46 to the armature shaft 18, a linking hole 46b is provided to an end of the worm shaft 46 located on the opening side of the gear case 43, and a linking convex 18a is provided to a tip of the armature shaft 18. When the gear case 43, that is, the frame unit 13 accommodating the deceleration mechanism 45 is attached to the motor yoke 15 of the motor body 12, the linking convex 18a provided to the tip of the armature shaft 18 is inserted into the linking hole 46b of the worm shaft 46, whereby the worm shaft 46 is connected to the armature shaft 18.

The worm wheel 47 is fixed to a center of an axis of an output shaft 51 so as to be rotatably accommodated in the gear case 43. An outer circumferential portion of the worm wheel 47 is caused to mesh with the worm 46a. Thereby, when the armature shaft 18 rotates, the rotation is decelerated up to predetermined rotation speed by the worm shaft 46, that is, the worm 46a and the worm wheel 47, and is outputted from an output shaft 51.

Although being not shown in detail, a tip portion of the output shaft 51 projects from the gear case 43 and the tip portion of the output shaft 51 projecting from the gear case 43 is provided with a pinion etc. (not shown), thereby being connected to a regulator of the power window apparatus (not shown).

Meanwhile, the connector unit 42 is made of a resin formed by injection-molding a resin material and, as shown in FIG. 6, includes a pinching part 52, and a power-supply connector part 53 formed integrally therewith.

The pinching part 52 is formed into an annular shape having a nearly oval corresponding to an outer shape of the base part 25b of the brush holder 25, and a plate-like flat part 54 vertical to the axial direction of the armature shaft 18 is provided integrally with the pinching part 52 and inside the pinching part 52. The flat part 54 is integrally provided with a pair of skirt parts 55 and 56 projecting in the axial direction toward the gear case 43, and the connector unit 42 is mounted in the gear case 43 by the pinching part 52 being guided by the guide part 43*a* as well as by the skirt parts 55 and 56 being inserted into the opening of the gear case 43.

A plurality of ribs 57 each extending in the axial direction and projecting radially outwardly with predetermined height are provided on an outer circumference of each of the skirt parts 55 and 56, and the skirt parts 55 and 56 are inserted into the gear case 43 so that the ribs 57 contact with an inner face of the gear case 43 and is slightly elastically deformed in the diameter direction. For this reason, the connector unit 42 is mounted in the gear case 43 with light press-fitting, thereby being prevented from being accidentally removed from the gear case 43.

A through hole 58 is provided at the center of the axis of the flat part 54, and when the frame unit 13 is assembled to the motor body 12, the armature shaft 18 is connected to the worm shaft 46 via the through hole 58.

A sensor base 61, which is a predetermined distance away from the flat part 54 and parallel to the flat part 54, is provided inside the skirt part 55 of the connector unit 42. A pair of hall sensors 62 as rotation sensors is loaded on the sensor board 61, and the hall sensors 62 are arranged to oppose to a ring magnet 63 fixed to the armature shaft 18 in the axial direction. The ring magnet 63 has a plurality of magnetic poles each spaced at an equal interval in the circumferential direction, so that when the armature shaft 18 rotates, each of the hall sensors 62 outputs a pulse signal with a period inversely proportional to rotation speed of the armature shaft 18. In addition, the hall sensors 62 are spaced by a phase of 90 degrees from each other in the rotational direction, whereby a rotational direction of the armature shaft 18 can be detected based on order of occurrence of the pulse signals outputted from the respective hall sensors 62.

Note that each of the hall sensors 62 is connected to an external connector (not shown) via a sensor terminal (not shown) disposed in the connector part 53 using a lead plate (not shown) embedded in the connector unit 42 by insertion molding, and the pulse signal outputted from each of the hall sensors 62 is inputted into a control device (not shown) for controlling the motor via the external connector. The control device controls an operation of the motor body 12 based on the rotation speed and the rotational direction of the armature shaft 18, which are recognized from the inputted pulse signals.

When the frame unit 13 is attached to the motor body 12, the flat part 54 of the frame unit 13 is disposed so as to overlap with the base part 25*b* of the brush holder 25 in the axial direction. Thereby, the brush holder 25 is sandwiched and fixed between the flat part 54 and the stepped portion 28 of the motor yoke 15.

As shown in FIG. 2, three engagement holes 64 opened toward the gear case 43 are provided in the base part 25*b* of the brush holder 25. As shown in FIG. 5, three engaging projections 65 projecting toward the motor body 12 are integrally provided to the flat part 54 of the connector unit 42. When the engaging projections 65 provided to the connector unit 42 are engaged with the corresponding engagement holes 64 provided in the brush holder 25, the pinching part 52 is intended to be positioned against the brush holder 25.

An annular seal member 66 is mounted on the pinching part 52 so as to cover the pinching part 52. Quality of a material of the seal member 66 is, for example, an elastomer material such as synthetic rubber, and the seal member 66 is integrally formed with the pinching part 52 by two-color molding. When the frame unit 13 is assembled to the motor body 12, the seal member 66 is sandwiched between the flange part 15*b* of the motor yoke 15 and the pinching part 52, and between the gear case 43 and the pinching part 52. That is, the pinching part 52 is intended to be sandwiched and fixed (fixed so as to be sandwiched) also between the flange part 15*b* of the motor yoke 15 and the gear cases 43 via the seal member 66. For this reason, even if the present embodiment adopts a structure in which the pinching part 52 is sandwiched between the motor yoke 15 and the gear case 43 to fix the connector unit 42, since the seal member 66 contacts with the flange part 15*b* of the motor yoke 15 and the opening end of the gear case 43, foreign materials such as rain and dust can be prevented from entering from such a sandwiched portion or area.

It should be noted that the seal member 66 is integrally formed with the pinching part 52 by two-color molding in Figures, but the present embodiment is not limited to such integral formation and may have a structure in which the seal member 66 formed separately from the pinching part 52 is attached to the pinching part 52 so as to be positioned between the flange part 15*b* of the motor yoke 15 and the pinching part 52 and between the gear case 43 and the pinching part 52.

Meanwhile, the connector part 53 is formed, as shown in FIGS. 1 and 6, into a box shape having a rectangular cross section whose one end is opened, and integrally formed with the pinching part 52 via a connecting part 67 projecting from between the motor yoke 15 and the gear cases 43. In addition, the connector part 53 is disposed outside the gear case 43 and the motor yoke 15 adjacently to the gear case 43, and connected to an external connector (not shown) provided to a side of the vehicle. Note that when the connector unit 42 is mounted on the gear case 43, the connecting part 67 is guided by the guide part 43*b* and positioned at a predetermined location.

A pair of lead plates formed of, for example, a plate material having conductivity such as a copper plate, is embedded into the connector unit 42 by insertion molding, and since one ends of the lead plates project inside the connector part 53, a pair of power connection terminals 71 is provided inside the connector part 53. Then, when the external connector is connected to the connector part 53, each of the power connection terminals 71 is intended to be connected to a control device via the external connector.

The other ends of the above-mentioned pair of lead plates embedded in the connector unit 42 project inside the pinching part 52 and in the axial direction in which the motor yoke 15 is attached from the flat part 54. Therefore, as shown in FIG. 5, a pair of connector-side connection terminals 72 is provided inside the pinching part 52. Each of the connector-side connection terminals 72 projects from the flat part 54 toward the brush holder 25 in the axial direction and disposed so as to align mutually.

It should be noted that the connector-side connection terminals 72 are, in Figures, formed of the lead plate together with the power connection terminals 71 to be electrically connected to the power connection terminals 71, but the present embodiment is not limited to such electrical connection and may adopt a structure in which the connector-side connection terminals 72 and the power connection terminals 71 are formed separately to be electrically connected by the lead plate.

Meanwhile, as shown in FIG. 2, a pair of brush-side connection terminals 73 is provided to the brush holder 25 so as to oppose to the connector-side connection terminals 72 of the connector unit 42.

Each of the brush-side connection terminals 73 is formed of, for example, a plate material having conductivity such as a copper plate, and has a connection hole 73*a* with a rectangular cross section. These connection holes 73*a* are each formed with a side corresponding to that of the connector-side connection terminal 72, and each of the brush-side connection terminals 73 aligns with and fixed to the base part 25b of the brush holder 25 so that the connection holes 73a are opened toward the gear case 43. In addition, as shown in FIG. 3, the brush-side connection terminals 73 are provided with plate-shaped connection portions 73b, and the connection portions 73b are electrically connected to the corresponding brushes 26 via the lead plates 74 and 75.

Note that, to protect the armature coil 22 from an excess current, a circuit breaker 76 is connected between the lead plate 74 and the brush 26.

Figure 7:
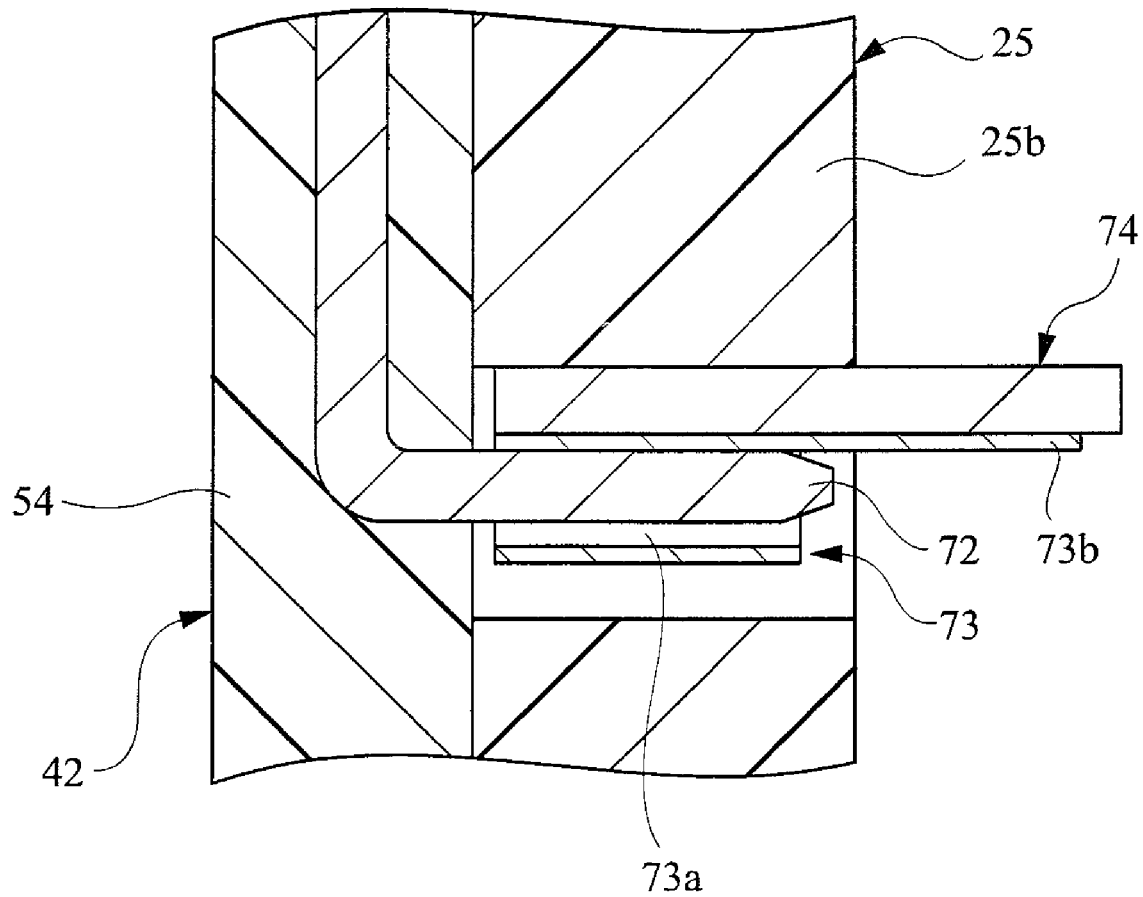
FIG. 7 is a sectional view showing a detail of a connecting portion of a brush-side connection terminal and a connector-side connection terminal.

FIG. 7 is a sectional view showing a detail of a connecting segment between the brush-side connection terminal 73 and the connector-side connection terminal 72. When the pinching part 52 is disposed so as to overlap with the brush holder 25 in the axial direction, the connector-side connection terminal 72 is inserted into the connection hole 73a of the corresponding brush-side connection terminal 73 to be electrically connected to the corresponding brush-side connection terminal 73. Thereby, a driving current supplied from the control device via the external connector can be supplied to each of the brushes 26 via the power connection terminal 71 of the connector part 53, the connector-side connection terminals 72, and the brush-side connection terminals 73.

Figure 8:
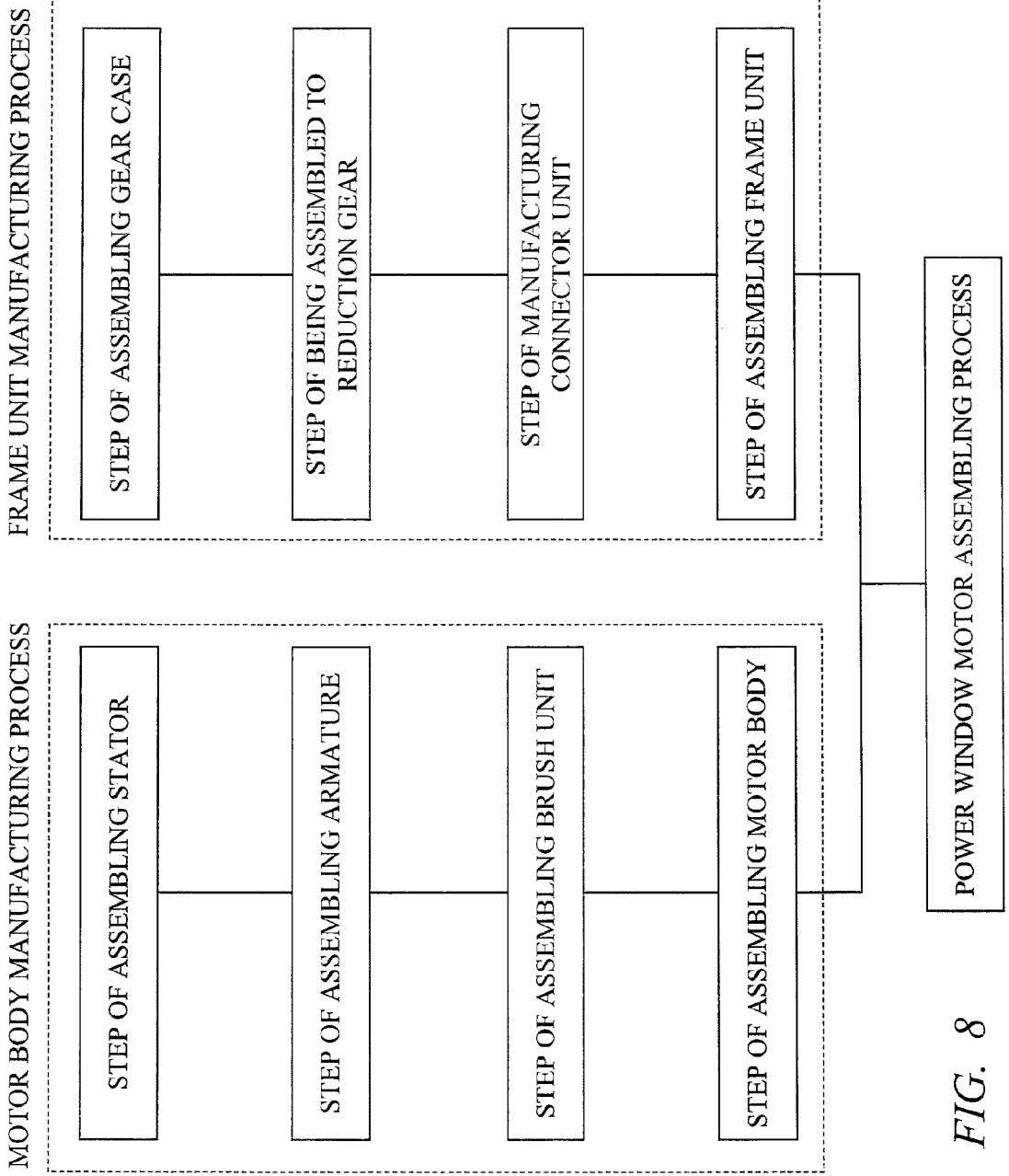
FIG. 8 is a process chart showing a manufacturing process of the power window motor shown in FIG. 1.
Figure 9A:
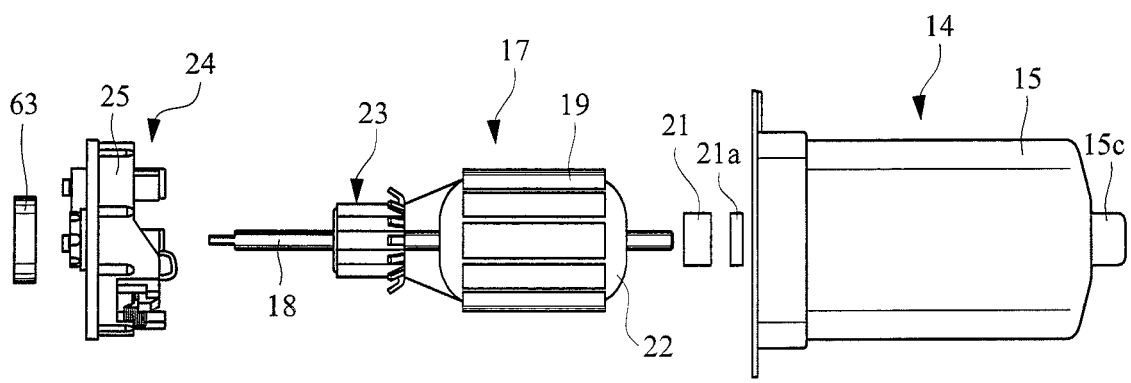
FIG. 9A is a view showing a step of assembling the motor body.
Figure 9B:
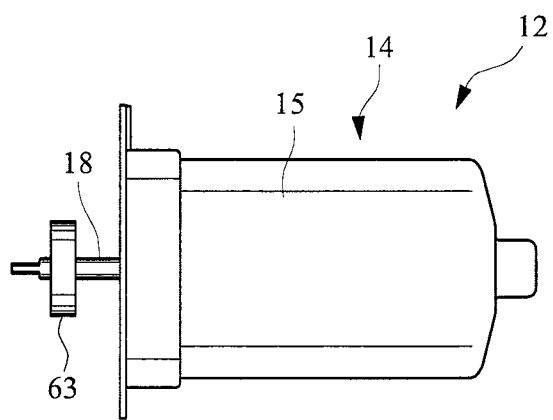
FIG. 9B is a view showing the step of assembling the motor body.
Figure 10A:
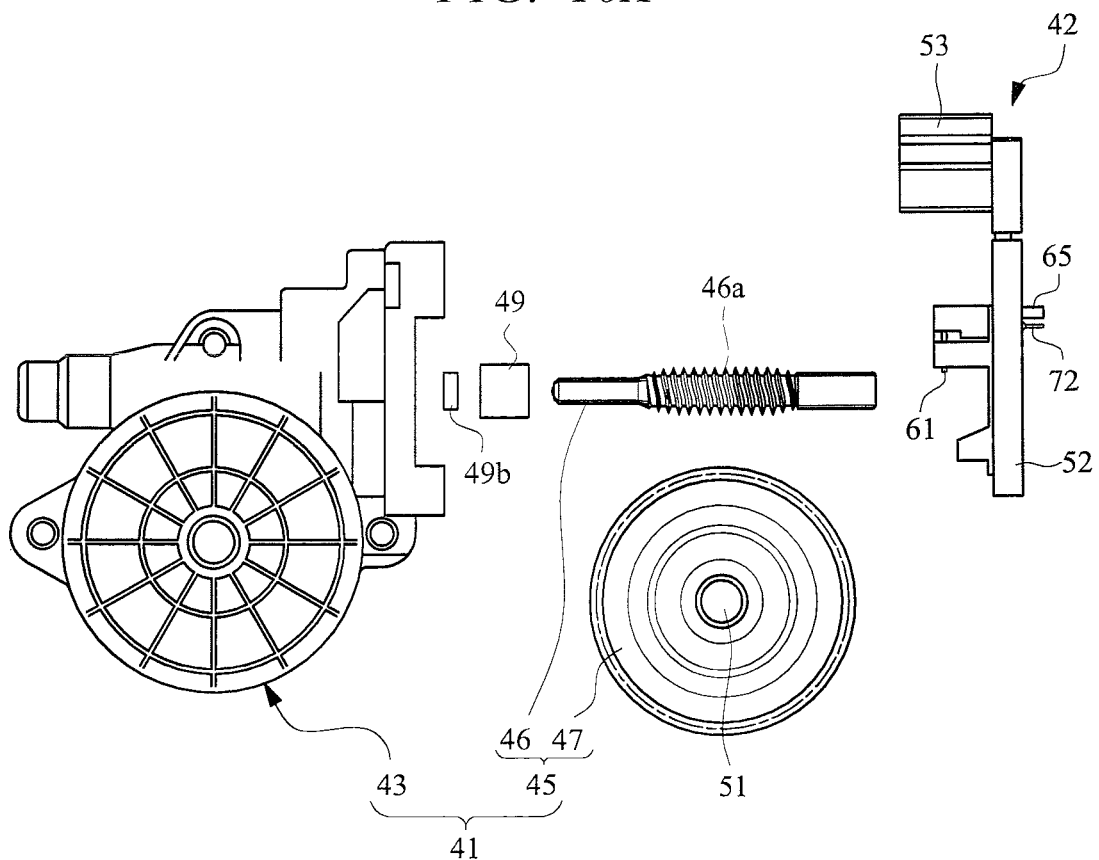
FIG. 10A is a view showing a step of assembling the frame unit.
Figure 10B:
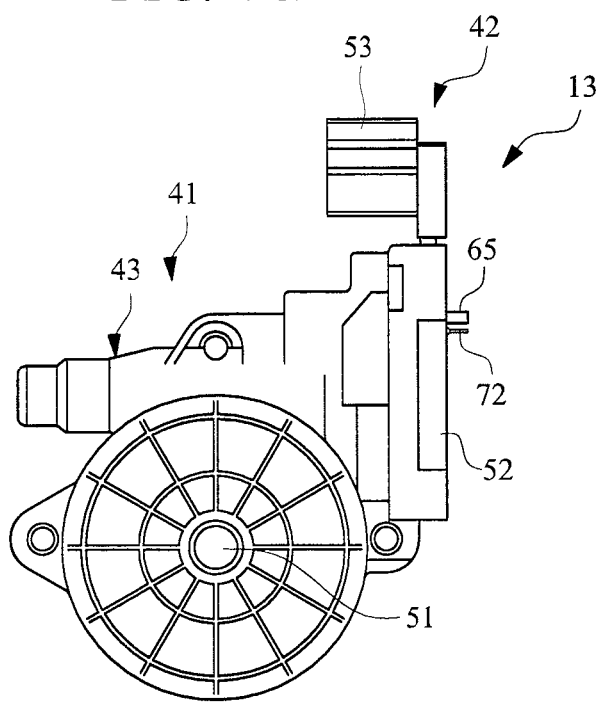
FIG. 10B is a view showing the step of assembling the frame unit.
Figure 11A:
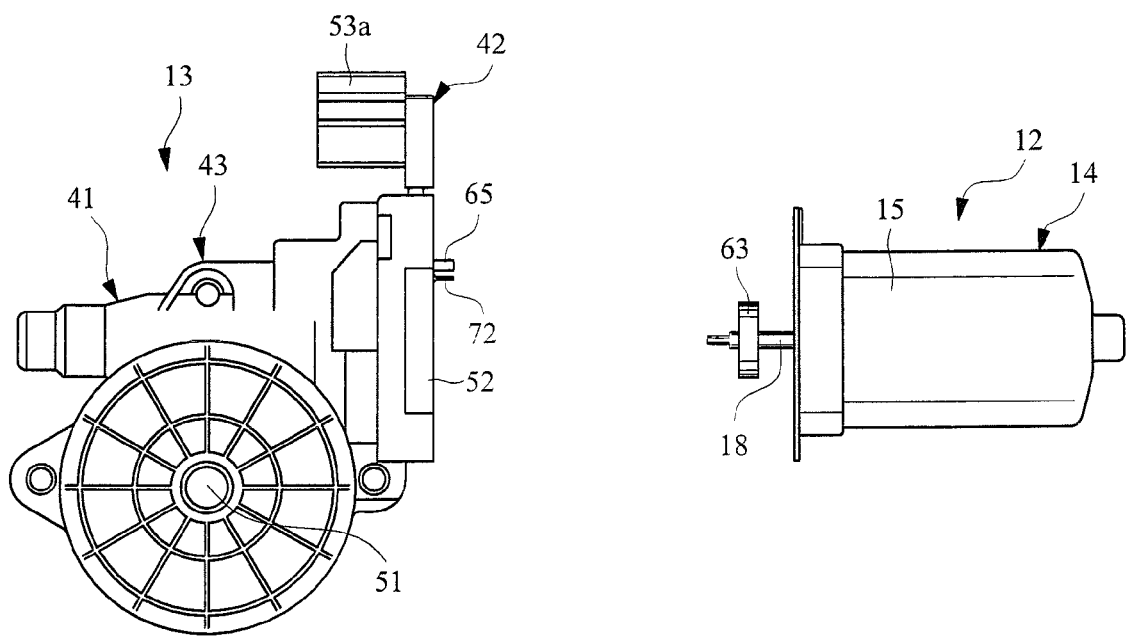
FIG. 11A is a view showing a step of being assembled to the motor body and the frame unit.
Figure 11B:
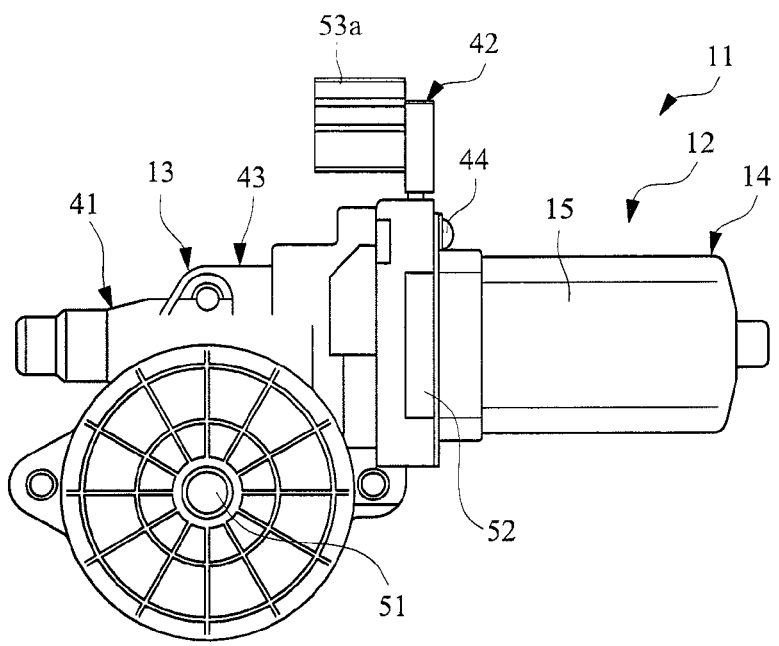
FIG. 11B is a view showing the step of being assembled to the motor body and the frame unit.

FIG. 8 is a process chart showing a manufacturing process of the power window motor 11 shown in FIG. 1; FIGS. 9A and 9B are each a view showing a step of assembling the motor body; FIGS. 10A and 10B are each a view showing a step of assembling the frame unit 13; and FIGS. 11A and 11B are each a view showing a step of being assembled to the motor body 12 and the frame unit 13.

Next, a manufacturing method of the power window motor 11 will be described based on FIGS. 8 to 11(B).

As shown in FIG. 8, in the manufacturing method of the power window motor 11, the motor body 12 and the frame unit 13 are manufactured in separate production lines, that is, by a parallel method in which the manufacturing process of the motor body 12 and the manufacturing process of the frame unit 13 are performed in parallel.

Firstly by a stator assembling step in the manufacturing process of the motor body 12, as shown in FIG. 9A, the pair of magnets 16 is mounted on the inner face of the motor yoke 15, and the bearing 21 is held by the bearing support part 15c provided to the bottom wall part 15a of the motor yoke 15, whereby a stator 14 is assembled. Next, in an armature assembling step, the commutator 23 and the armature core 19 are fixed to the armature shaft 18, and the armature coil 22 is wound around the armature core 19, its coil end being connected to the commutator 23, whereby the armature 17 is assembled. Then, in a brush unit assembling step, the pair of brushes 26, the springs 33, and the brush-side connection terminals 73, etc. are attached to the resin-molded brush holder 25, whereby the brush unit 24 is assembled. When the ring magnet 63 is prepared in addition to the stator 14, the armature 17, and the brush unit 24, the armature 17 and the brush unit 24 are assembled to the stator 14 and the ring magnet 63 is fixed to the armature shaft 18 in a motor body assembling step, whereby the motor body 12 is completed as shown in FIG. 9B. It should be noted that the bearing 21 may be constituted so to be fixed to the end portion of the armature shaft 18 in advance.

On the other hand, firstly by a gear case assembling step in the manufacturing process of the frame unit 13, as shown in FIG. 10A, the gear case 43 is assembled. Next, in a deceleration mechanism assembled step, the deceleration mechanism 45 including the worm shaft 46 and the worm wheel 47, and the output shaft 51 are assembled to the gear case 43 to assemble the reduction gear 41. Thus, the reduction gear 41 is manufactured by the gear case assembling step and the deceleration mechanism assembled step. Next, in a connector unit manufacturing step, the connector part 53 with the power connection terminals 71, the flat part 54 with the connector-side connection terminals 72, and the pinching part 52 are formed by insertion-molding the lead plate using a resin material, and the sensor board 61 is assembled to such an insertion-molding member, whereby the connector unit 42 is assembled. When the reduction gear 41 and the connector unit 42 are prepared, the connector unit 42 is next mounted on the reduction gear 41 in a frame unit assembling step, whereby the frame unit 13 is completed as shown in FIG. 10B.

As shown in FIG. 11A, when the motor body 12 manufactured in the motor body assembling step and the frame unit 13 manufactured in the frame unit assembling step are prepared, the gear case 43 of the reduction gear 41 is next fixed to the flange part 15b of the motor body 12 in the power window motor assembling step so that the pinching part 52 of the connector unit 42 is sandwiched and fixed between the motor yoke 15 and the gear case 43. At this time, the brush holder 25 mounted in the inner face of the motor yoke 15 with light press-fitting is also sandwiched and fixed between the stepped portion 28 of the motor yoke 15 and the flat part 54.

Then, the linking convex 18a provided on the armature shaft 18 is inserted into the linking hole 46b provided in the worm shaft 46, and the worm shaft 46 is connected to the armature shaft 18. Further, the connector-side connection terminals 72 provided to the connector unit 42 are electrically connected to the brush-side connection terminals 73 provided to the brush holder 25, and each of the brushes 26 is electrically connected to the power connection terminals 71 of the connector part 53 connected to the external connector.

Thus, the frame unit 13 is assembled to the motor body 12, and the power window motor 11 is completed.

Figure 12:
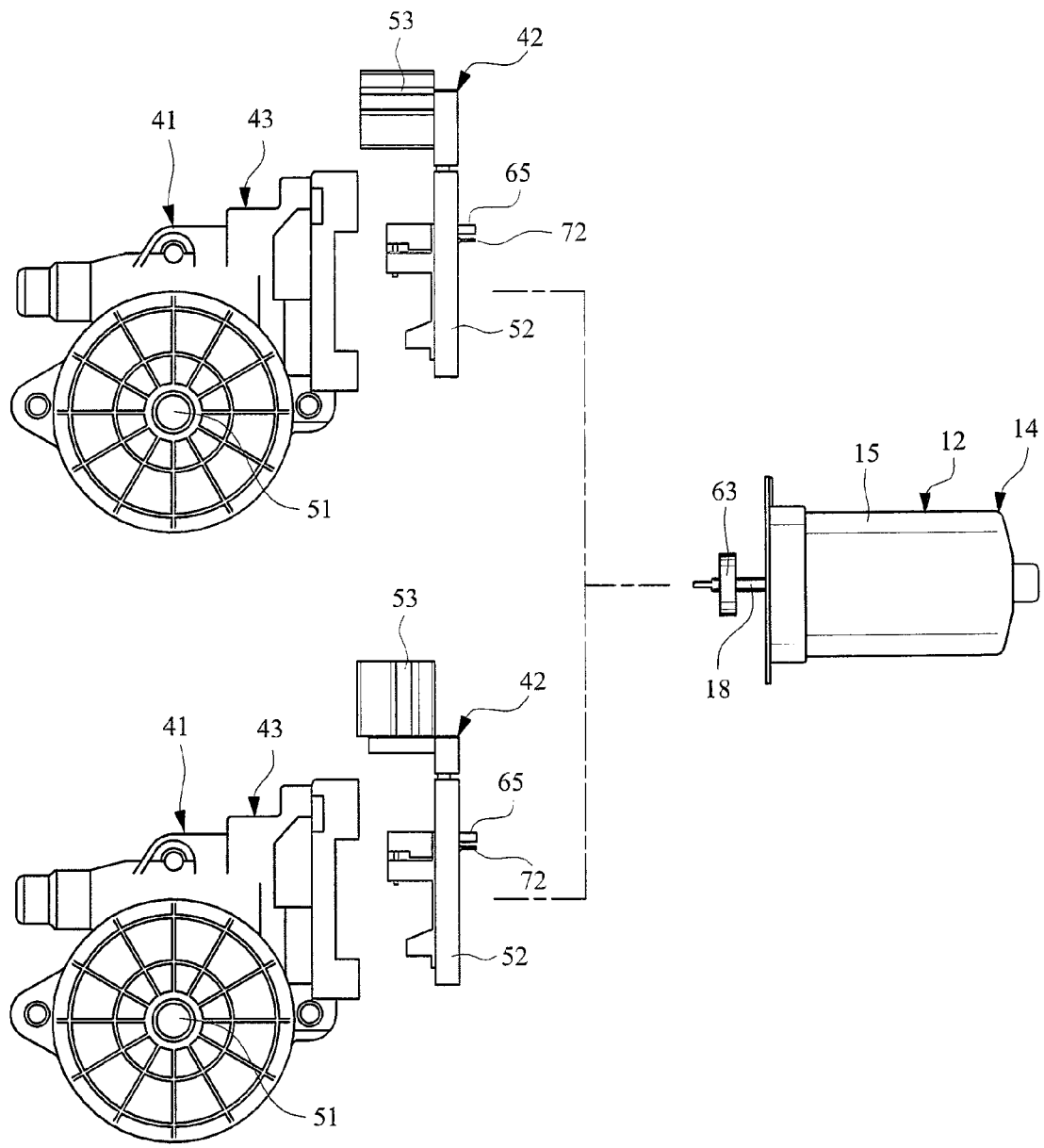
FIG. 12 shows a view for explaining a manufacturing method for two types of power window motors different in specification of the connector part.

FIG. 12 is a view for explaining a manufacturing method of two types of power window motors 11 different in specification of the connector part.

In this power window motor 11, the connector unit 42 provided with the power-supply connector part 53 is formed separately from the brush holder 25 and is sandwiched and fixed between the reduction gear 41 and the motor body 12, so that a difference of specifications of the external connectors can be easily handled by changing only the specifications of the connector unit 42 without changing the specifications of the brush holder 25.

For example, as shown in FIG. 12, when two types of power window motors 11 based on specifications different in an inserting direction of the connector part 53 are manufactured, the reduction gears 41 and the motor bodies 12, that is, the brush holders 25 are prepared using the same specification and two types of connector parts 53 different in specification are prepared as the connector units 42, whereby the two types of power window motors 11 different in specification can be easily manufactured.

Thus, in the power window motor 11, since the connector unit 42 provided with the power-supply connector part 53 is formed separately from the brush holder 25, even when a plurality of types of power window motors 11 different in specification of the connector part 53 are manufactured correspondingly to the external connectors, the brush holder 25 based on a common specification can be used. Therefore, general versatility of the brush holder 25 can be enhanced with regard to a difference of the specifications of the external connectors, whereby costs of the power window motor 11 can be reduced.

In addition, in the power window motor 11, since the pinching part 52 of the connector unit 42 is disposed so as to overlap with the base part 25b of the brush holder 25 in the axial direction, the brush-side connection terminals 73 provided to the brush holder 25 and the connector-side connection terminals 72 provided to the connector unit 42 are electrically connected, and each of the brushes 26 is connected to the power connection terminals 71 provided in the connector part 53. Therefore, even when the connector unit 42 and the brush holder 25 are formed separately, the brushes 26 and the power connection terminals 71 can be electrically connected by an easy constitution described above, respectively.

Meanwhile, in the power window motor 11, the armature shaft 18 of the motor body 12 is separated from the worm shaft 46 so as to be connected to the worm shaft 46 of the reduction gear 41. When the motor body 12 is completed, the armature shaft 18 is rotatably supported by the motor yoke 15 and the brush holder 25. Therefore, even when the frame unit 13 is not attached to the motor body 12, the armature shaft 18, that is, armature 17 becomes rotatable. In addition, the pair of brush-side connection terminals 73 electrically connected respectively to the brushes 26 is provided to the brush holder 25 in a state of exteriorly projecting from the brush holder 25. Therefore, by connecting a power source directly to the brush-side connection terminals 73, the motor body 12 alone can be operated.

Thus, in the power window motor 11, since the motor body 12 is constituted as one unit that can be operated alone even if being not attached to the reduction gear 41 or/and the connector unit 42, as shown in FIG. 8, the motor body 12 can be manufactured in a production line different from that of the frame unit 13. Therefore, even when a plurality of types of power window motors 11 different in specification of the connector part 53 are manufactured, the motor bodies 12 used for all the specifications can be more efficiently manufactured by production concentration.

In addition, in the power window motor 11, since the motor body 12 has a small and simple shape without the connector part 53, a transportation cost for transporting the motor body 12 to a site of assembling the frame unit 13 can be reduced.

Further, in the power window motor 11, since the motor body 12 can be operated alone, an operation test can be performed to the motor body 12 manufactured by the production concentration before transportation of the motor body 12 to respective sites. Thereby, the motor bodies 12 with high working reliability can be transported to the respective sites.

Figure 13:
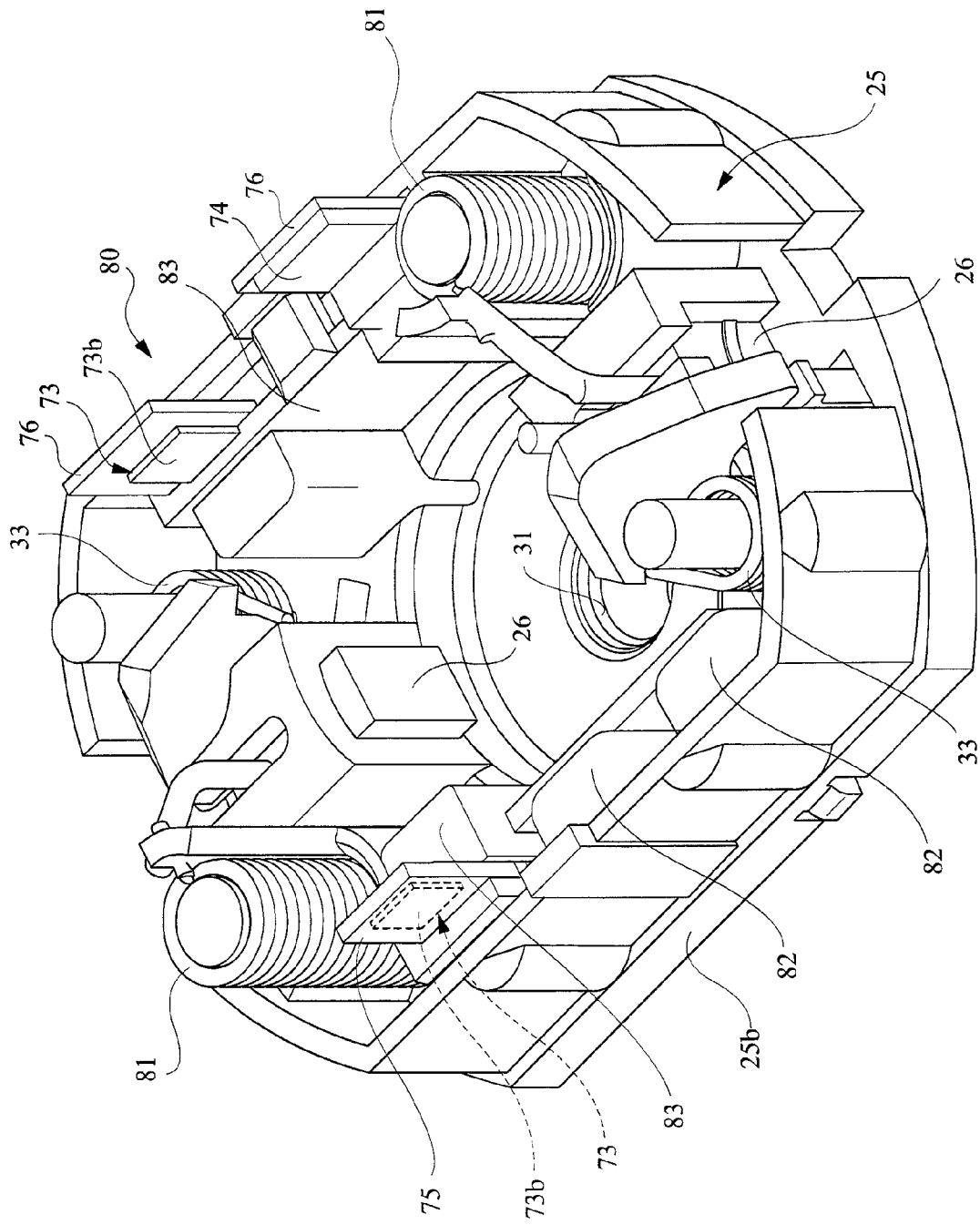
FIG. 13 is a perspective view in which a brush unit according to another embodiment of the present invention is viewed from behind.

Next, another embodiment of the present invention will be described in detail based on the drawings. Note that the same reference numerals are denoted to portions or parts having the same functions as that of the embodiment mentioned above, and detailed description thereof will be omitted. FIG. 13 is a perspective view in which a brush unit according to another embodiment of the present invention is viewed from behind.

A brush unit 80 according to another embodiment is different from the above-mentioned embodiment in that the pair of brushes 26 is disposed on the base part 25b of the brush holder 25, which constitutes the brush unit 80, so as to be oppose to each other, that is, to be mutually shifted by 180 degrees along the rotational direction of the armature shaft 18 (see FIG. 1).

The respective brushes 26 are provided on both arc sides (upper and lower sides in Figure) each having a relatively large space in the nearly oval base part 25b, and correspondingly thereto, the springs 33 for biasing the brushes 26 toward the commutator 23 (see FIG. 1) are disposed in the vicinity of the respective brushes 26 in the base part 25b. In addition, the connection portions 73b of the brush-side connection terminals 73 electrically connected to the brushes 26 are electrically connected via the respective lead plates 74 and 75, the choking coils 81, the condensers 82, and the circuit breaker 76, etc. Each of the lead plates 74 and 75 is inserted, by insertion molding etc., into each insertion portion 83 integrally provided with the base part 25b so as to oppose to each other and to be centered about the through hole 31 formed at the center of the axis of the base part 25b. Note that each electric connection portion is connected by spot welding etc.

Thus, each of the connection portions 73b in the present embodiment is provided at a location farther than that of each of the connection portions 73b according to the above-mentioned embodiment. Therefore, although being not shown in detail, the pair of connector-side connection terminals 72 (see FIG. 5) insertion-molded in the connector unit 42 is provided correspondingly to an interval between the respective connection portions 73b. Note that the choking coils 81 and the condensers 82 function to absorb electrical noise emitted to the outside via the respective brushes 26.

The power window motor 11 including the brush unit 80 having a structure as mentioned above can also have the same operations and effects as those of the above-mentioned embodiment. In addition to this, according to another embodiment, since the brushes 26 are provided so as to oppose to and separate from each other, the lead plates 74 and 75 and the connection portions 73b, etc. to be electrically connected respectively to the brushes 26 can be also provided to the brush holder 25 so as to separate from each other. Therefore, these electronic parts can be easily assembled to the brush holder 25.

Needless to say, the present invention is not limited to the above embodiments, and may be variously modified and altered within a scope of not departing the gist of the present invention. In the above embodiments, for example, the present invention is applied to the power window motor 11 in which the frame unit 13 attached to the motor body 12. However, the present invention is not limited to this example, and may be applied to, for example, the electric motor having no reduction gear 41. In this case, an end case is fixed to the opening end of the motor yoke 15 instead of the gear case 43. In addition, the present invention may be applied not only to the power window motor 11 used as a drive source for a power window apparatus but also to an electric motor used for any other applications such as a drive source for an automatic opening/closing device for vehicle etc. that drives automatically an opening/closing body such as a slide door, a back door, and a sunroof provided in the vehicle body.

In addition, in the above-mentioned embodiments, the worm shaft 46 constituting the deceleration mechanism 45 is formed separately from the armature shaft 18. However, the present invention is not limited to this, and may have a structure of forming the armature shaft 18 so as to have length enough to reach an interior of the gear case 43; and forming the worm 46a integrally with the outer circumference of the armature shaft 18.

In addition, in the above-mentioned embodiments, the brush-side connection terminals 73 are formed into concave shapes and the connector-side connection terminals 72 are formed into convex shapes. However, the present invention is not limited to this, and may have a structure in which the brush-side connection terminals 73 are formed in convex shapes and the connector-side connection terminals 72 are formed into concave shapes.

In addition, in the above-mentioned embodiments, the axial directional end portion of the ring part 25a of the brush holder 25 is positioned axially inside the motor yoke 15 by abutting on the abutment surface 28a of the stepped portion 28 provided to the inner face of the motor yoke 15, and when the pinching part 52 of the connector unit 42 is sandwiched between the motor yoke 15 and the gear case 43, the brush holder 25 is also sandwiched and fixed between the stepped portion 28 of the motor yoke 15 and the pinching part 52. However, the present invention is not limited to this, and may have a structure in which deformable and small projections are provided at a position opposite to the stepped portion 28 on the axial-directional end face of the ring part 25a and at a position opposite to the later-described connector unit 42 of the base part 25b; the projection of the ring part 25a is constituted so as to abut on the stepped portion 28 when light press-fitted to the motor yoke 15 in the axial direction; and shapes of the small projections are deformed by fixing the motor yoke 15 and the gear case 43, whereby the brush holder 25 is sandwiched between the stepped portion 28 of the motor yoke 15 and the connector unit 42.

Further, in the above-mentioned embodiments, the pair of brushes 26 is held at the brush holder 25, the pair of connector-side connection terminals 72 is provided in the connector unit 42, and the pair of brush-side connection terminals 73 is provided opposite to the pair of connector-side connection terminals 72 in the brush holder 25, but the present invention is not limited to this. For example, as with a windshield wiper motor used as a drive source of a wiper device, three brushes 26 including a common brush, a low-speed driving brush, and a high-speed driving brush may be provided in the brush unit 24. In this case, the present invention may have a structure in which the three brushes 26 are provided in the brush holder 25; the three connector-side connection terminals 72 are provided in the connector unit 42; and the three brush-side connection terminals 73 are provided in the brush holder 25 opposite to the three connector-side connection terminals 72.

What is claimed is:

1. An electric motor with brush having a commutator and a plurality of brushes brought in slide contact with the commutator, the electric motor with brush comprising:
    a motor case formed into a bottomed cylindrical shape whose one end has an opening and in an inner face of which a magnetic field portion is provided;
    a brush holder mounted inside the motor case and holding the plurality of brushes;
    an armature shaft rotatably supported by the motor case and fixing the commutator;
    a plurality of armature coils each connected to the commutator and rotating along with the armature shaft;
    an end case attached to an opening end of the motor case and blocking the opening of the motor case;
    a connector unit mounted in the end case including a pinching part disposed so as to overlap with the brush holder axially and sandwiched and fixed between the motor case and the end case, and a power-supply connector part integrally formed with the pinching part and disposed outside the motor case;
    a plurality of brush-side connection terminals provided in the brush holder and electrically connected respectively to the corresponding brushes; and
    a plurality of connector-side connection terminals provided in the connector unit, electrically connected respectively to power connection terminals provided to the connector part, and electrically connected to the corresponding brush-side connection terminals when the pinching part is disposed so as to overlap with the brush holder axially.

2. The electric motor with brush according to claim 1, wherein the pinching part is formed annularly, the pinching part is sandwiched and fixed by the end case and a flange part provided to the opening end of the motor case, and the plurality of connector-side connection terminals are each disposed inside the pinching part of the connector unit.

3. The electric motor with brush according to claim 2, wherein an axial-directional end portion of the brush holder is positioned inside the motor case by abutting on a stepped portion provided to the inner face of the motor case, and the brush holder is sandwiched between the connector unit and the motor case.

4. The electric motor with brushes according to claim 3, further comprising:
    a seal member sandwiched between the motor case and the end case on a side face of the motor case or end case in the pinching part.

5. The electric motor with brushes according to claim 4, wherein the end case is a gear case that accommodates a deceleration mechanism including a worm shaft with a worm and a worm wheel meshing with the worm, the worm shaft is connected to the armature shaft when the gear case is attached to the motor case.

6. The electric motor with brushes according to claim 5, wherein a guide part is provided in the end case, and the connector unit mounted in the end case by the pinching part being guided by the guide part.

7. The electric motor with brushes according to claim 4, wherein the end case is a gear case that accommodates a deceleration mechanism including a worm integrally formed with the armature shaft and a worm wheel meshing with the worm.

8. The electric motor with brushes according to claim 7, wherein a guide part is provided in the end case, and the connector unit mounted in the end case by the pinching part being guided by the guide part.

9. The electric motor with brushes according to claim 2, wherein a side face of the brush holder is press-fitted to the inner face of the motor case to be positioned inside the motor case.

10. The electric motor with brushes according to claim 9, further comprising:
    a seal member sandwiched between the motor case and the end case on a side face of the motor case or end case in the pinching part.

11. The electric motor with brushes according to claim 10, wherein the end case is a gear case that accommodates a deceleration mechanism including a worm shaft with a worm and a worm wheel meshing with the worm, the worm shaft is connected to the armature shaft when the gear case is attached to the motor case.

12. The electric motor with brushes according to claim 11, wherein a guide part is provided in the end case, and the connector unit mounted in the end case by the pinching part being guided by the guide part.

13. The electric motor with brushes according to claim 10, wherein the end case is a gear case that accommodates a deceleration mechanism including a worm integrally formed with the armature shaft and a worm wheel meshing with the worm.

14. The electric motor with brushes according to claim 13, wherein a guide part is provided in the end case, and the connector unit mounted in the end case by the pinching part being guided by the guide part.

15. The electric motor with brush according to claim 9, wherein a plurality of ribs extending in the direction parallel to the armature shaft are provided in the brush holder, and the brush holder is mounted on the inner face of the motor case with light press-fitting by each of the ribs contacting with the inner face of the motor case.

16. The electric motor with brush according to claim 15, further comprising:
  a seal member sandwiched between the motor case and the end case on a side face of the motor case or end case in the pinching part.

17. The electric motor with brushes according to claim 16, wherein the end case is a gear case that accommodates a deceleration mechanism including a worm shaft with a worm and a worm wheel meshing with the worm, the worm shaft is connected to the armature shaft when the gear case is attached to the motor case.

18. The electric motor with brushes according to claim 17, wherein a guide part is provided in the end case, and the connector unit mounted in the end case by the pinching part being guided by the guide part.

19. The electric motor with brushes according to claim 16, wherein the end case is a gear case that accommodates a deceleration mechanism including a worm integrally formed with the armature shaft and a worm wheel meshing with the worm.

20. The electric motor with brushes according to claim 19, wherein a guide part is provided in the end case, and the connector unit mounted in the end case by the pinching part being guided by the guide part.

* * * * *